US006652381B1

(12) United States Patent
Ungaro

(10) Patent No.: US 6,652,381 B1
(45) Date of Patent: Nov. 25, 2003

(54) ADJUSTABLE COIN ACCEPTOR GATE

(75) Inventor: Mark Curran Ungaro, 2144 Tona Cir., Las Vegas, NV (US) 89109

(73) Assignee: Mark Curran Ungaro, Las Vegas, NV (US)

( * ) Notice: Subject to any disclaimer, the term of this patent is extended or adjusted under 35 U.S.C. 154(b) by 58 days.

(21) Appl. No.: 09/976,905

(22) Filed: Oct. 15, 2001

(51) Int. Cl.[7] .......................... A63F 13/00; A63F 9/24; G06F 17/00; G06F 19/00

(52) U.S. Cl. .......................... 463/29; 463/12; 273/309; 273/292; 453/1; 453/15; 453/58; 453/59; 453/60

(58) Field of Search .......................... 463/1–8, 12, 29; 273/309, 292; 453/1–15, 18–23, 58–60

(56) References Cited

U.S. PATENT DOCUMENTS

| | | | | | |
|---|---|---|---|---|---|
| 4,398,550 | A | * | 8/1983 | Shireman | 453/32 |
| 4,441,515 | A | * | 4/1984 | Goepner | 453/32 |
| 5,007,519 | A | * | 4/1991 | Mercurio | 194/230 |
| 5,836,818 | A | * | 11/1998 | Jones et al. | 463/29 |
| 5,876,275 | A | * | 3/1999 | Rasmussen | 453/32 |
| 5,944,162 | A | * | 8/1999 | Filiberti | 194/204 |
| 6,357,622 | B1 | * | 3/2002 | Ayotte | 221/90 |
| 6,370,242 | B1 | * | 4/2002 | Speers et al. | 379/145 |
| 6,520,308 | B1 | * | 2/2003 | Martin et al. | 194/317 |

* cited by examiner

*Primary Examiner*—Teresa Walberg
*Assistant Examiner*—Robert Mendoza

(57) ABSTRACT

An adjustable coin acceptor gate for use in accepting coins or tokens of all sizes from the United States coin or equivalent to the large gaming token or chip in use today in the gaming industry. The adjustable coin acceptor gate can be manually adjusted or electronically adjusted to accept the size or denomination or the coin or token in use for the particular game or vending machine in use and left open for multiple coin and token wagers.

12 Claims, 5 Drawing Sheets

ADJUSTABLE COIN ACCEPTOR GATE

BACKGROUND OF THE INVENTION

The device relates to coin acceptors in use on gaming tables that are standard to the industry. The acceptors in use today are designed to accept a particular chip or token on live gaming tables. The acceptors are located in front of each player station and controlled by the dealer pushing a button to accept the token or coin. A wiring harness and associated circuitry are electronically connected to the acceptor to activate the solenoid attached to the acceptor to pull back and let the chip or token pass through a series of optical sensors that activate the system to do what it was intended for it to accomplish. Some types of gaming token acceptors are used for card gaming tables. A good example would be for the games of Caribbean Stud Poker, Twenty One and 3 card poker. The acceptors use an electrical solenoid to accomplish their objective. The solenoid located below a top plate opening sized and configured to accommodate the drop path of the gaming token (as disclosed in U.S. Pat. No. 5,836,818 coin acceptor including multi-state visual indicator apparatus and method), acts as a stop and cannot detect what size of chip or token is placed in the slot and therefore will let the wager pass through. The solenoid plunger (being very sensitive) when wet by a drink or moisture from the players own hands will stick or stop functioning and therefore, have to be cleaned or replaced. Other times the coils overheat and have to be replaced causing a down time for that particular player station.

SUMMARY OF THE INVENTION

The present invention relates to a controllable interactive coin gate. The gate can be installed on any live table game. It can be preset to accept any size coin or token so the operator of the gaming establishment does not have to replace or change the plate or acceptor slot and not have to worry about one particular size of token or chip. Using a servo motor (that is standard to the industry) can be adjusted to either manually or electronically size the coin without removing the coin slot. By positioning the servo motor at the front or rear of the slot, the servo motor can be adjusted electronically to move a given distance and return to its starting position point to accept a certain size coin. The coin gate servo motor is connected to a computer that is programmed for the different size of coins or tokens. Using the coin gate, the operator can reduce at his convenience the amount of wager without changing the coin acceptor slots. For example, if the minimum bet is one dollar and the operator wants to change the minimum to a twenty-five cent or fifty cent minimum wager he can do so by entering the amount in the computer. The servo motor will automatically adjust the amount of travel of the plunger for the smaller wager. The operator then simply places the smaller wager adapter in the slot for the denomination that is to be bet. The torque of the servo motor will overcome most types of fluids or moisture simply because it is geared internally to push or pull with force. The adjustable coin acceptor gate can be set in the open position for multiple wagers depending on the players' amount to be wagered by using a series of three infrared phototransistors as the receivers of light and light emitting diodes as the dispatchers of light or coin switches (that are standard to the industry). For example, if the player would like to bet three dollars, the player would simply press the 3 credit button on the panel and the coin acceptor gate would stay open for the insertion of three tokens. After the tokens pass the coin counter switch or infrared phototransistor and light emitting diode the gate would automatically close. The player would then have three credits added to their station to play their game without inserting a token every hand. The computer would keep track of all wagers inserted and deduct it from their total wager as the game progressed. A series of three coin switches or infrared phototransistors and light emitting diodes would be used to count the amount wagered. The first infrared phototransistor and light emitting diode would be positioned just below the top plate. As the player inserts the token or coin, a sound and light would activate letting the dealer know that the betting action has begun. The dealer would press his accept button and observe that the coins or tokens have been inserted into the slot. The second infrared phototransistor and light emitting diode or switch mounted below the coin gate plunger would count and add the amount wagered and record it to memory for the computer to deduct it from the total amount bet. The third infrared phototransistor and light emitting diode or switch will activate the player station to participate in the game. Once the game has started in the computer, the gate would automatically close and reset to one token or coin until the dealer accepts the wager or wagers all over again.

BRIEF DESCRIPTION ON THE DRAWINGS

The invention will be described with reference to the accompanying drawings forming a part of the specification, in which like reference characters designate similar components, wherein:

FIG. 1 illustrates a side view of components of the coin gate acceptor as described in the present invention indicating the typical mounting of the servo motor 12 connected to the servo arm 20 and plunger 14 with wiring 22 connected to the computer.

Figure 4:
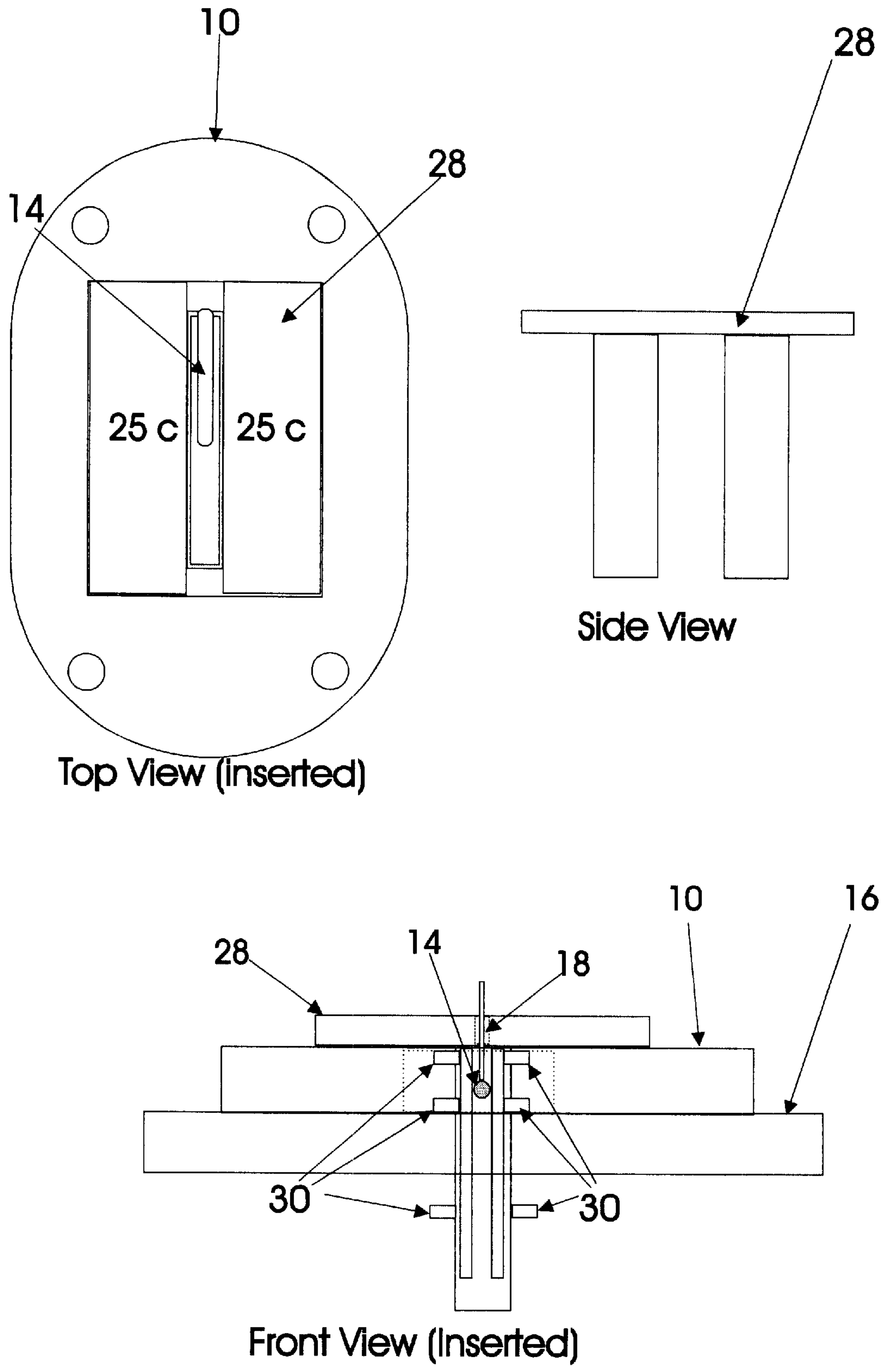

FIG. 4 illustrates the adapter used for changing the size of the coin acceptor gate. The top view depicts the adapter inserted into the top plate. The side view of the adapter is cut to accommodate the infrared phototransistors as the receiver and a light emitting diodes as the dispatcher of light or coin switches as depicted. The front view of the inserted adapter depicts how the coin or token is resting on the plunger before it passes through the gate.

Figure 5:
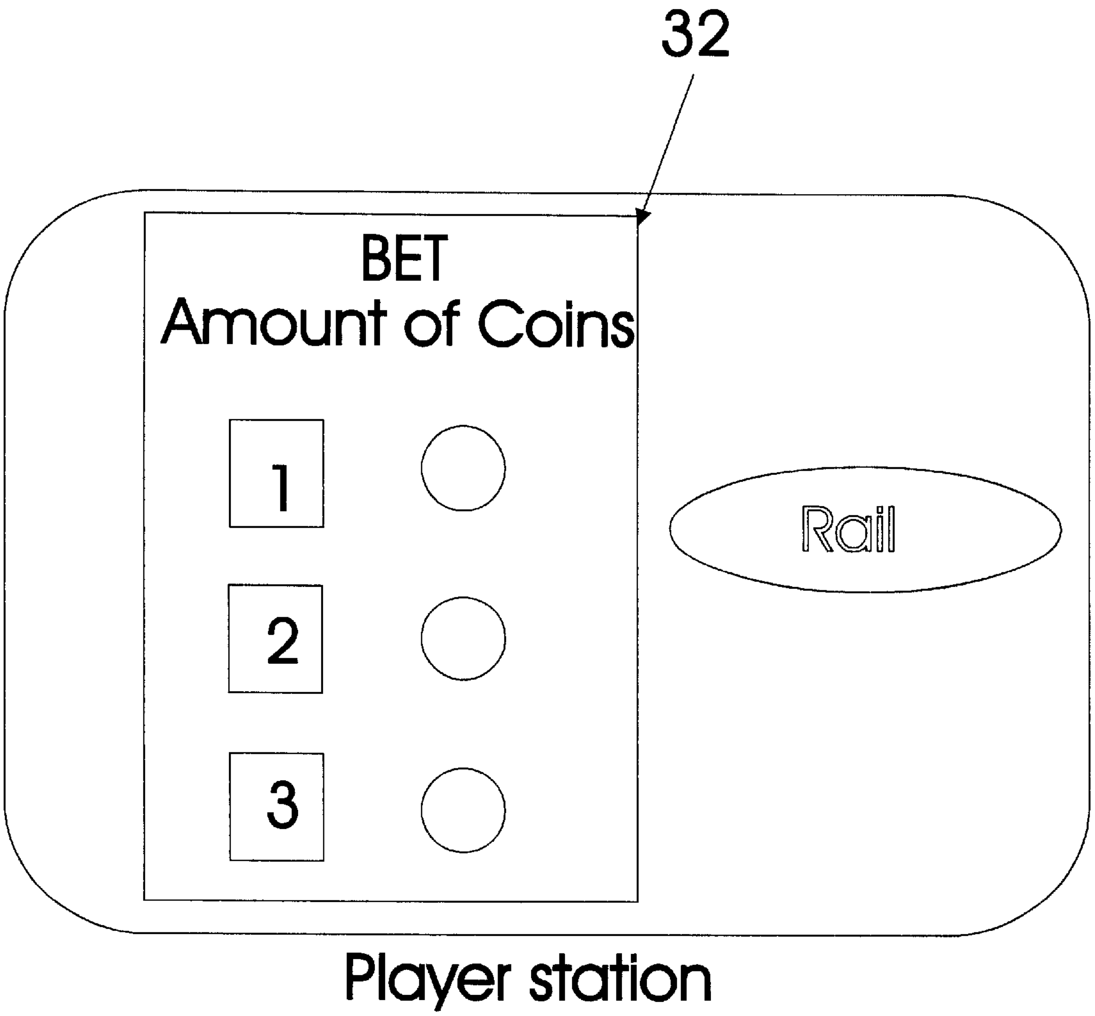

FIG. 5 illustrates a typical player station control panel indicating the amount of coin or tokens that can be wagered.

DETAILED DESCRIPTION OF THE PREFERRED EMBODIMENT

Figure 1:
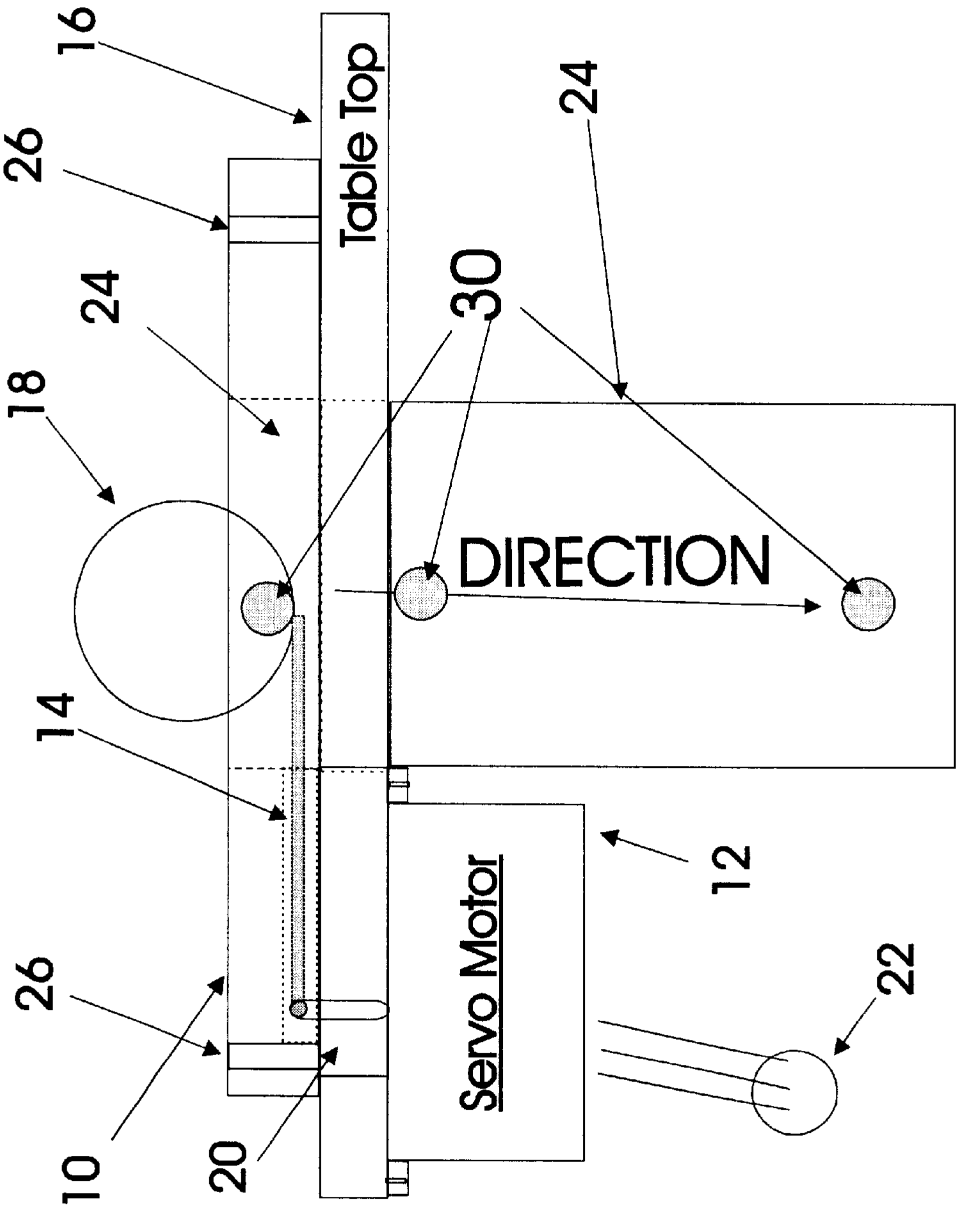
Figure 2:
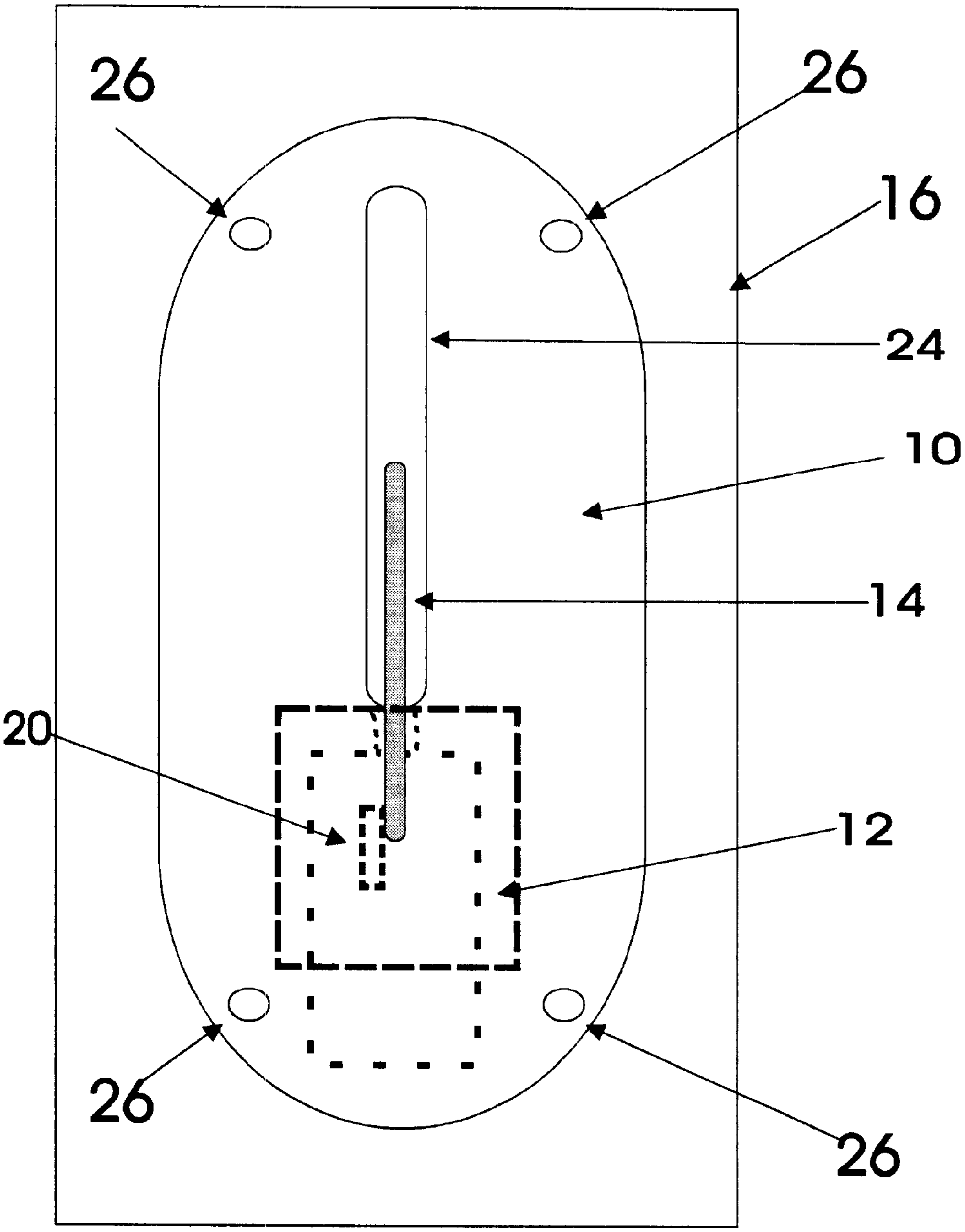
FIG. 2 illustrates a top plan view of the coin acceptor gate as described in FIG. 1, depicting the typical mounting on the table surface 16 using the mounting screw holes 26.
Figure 3:
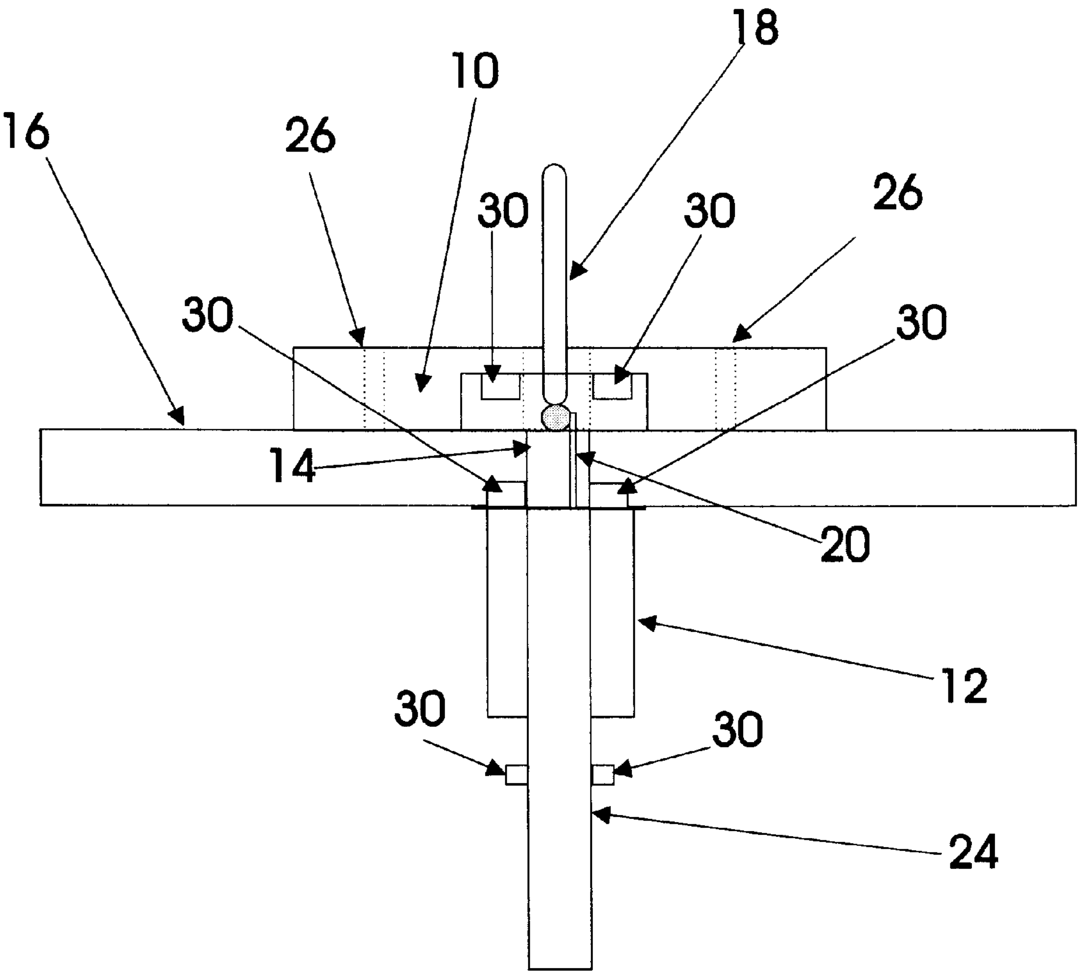
FIG. 3 illustrates a front view of the coin acceptor gate mounted into the table depicting the infrared phototransistor as the receiver and a light emitting diode as the dispatcher of light or coin switches, the plunger and servo motor behind the gravity coin chute.

FIG. 1 illustrates a coin acceptor gate 10 according to the preferred embodiment of the invention mounted into the table surface 16 of a Pro-Aggressive Roulette table (U.S. Patent application Ser. No. 09/799,889). The coin gate slot 24 of the coin acceptor gate 10 is dimensioned and designed to accept a standard size token or coin 18 on a Pro-Aggressive Roulette table and be able to accept one or more wagers at one time. The coin gate acceptor 10 is positioned about the table at six or seven specific locations for the player to access the Pro-Aggressive Jackpot. The adjustable coin acceptor gate 10 is programmed to stay in the closed position when there is not a token in the slot 24. When the player inserts the coin 18 into the slot 24 the infrared phototransistor and light emitting diode or coin switch 30 will sense the token 18 and alert the dealer by a light emitting and a sound or electronic bell that the token has been placed and ready for him to accept the wager. The dealer then accepts the wager by pressing the accept button on his control panel sending a signal to the servo motor 12. The servo motor 12 pulls back the plunger 14 located in the center of the coin gate slot 24 and lets the coin or token pass. The coin acceptor gate 10 will default only to accept a token or coin 18 one at a time unless the player presses a button located at his or her player station 32, FIG.5., alerting the computer to keep plunger 14 of the gate open until all coins have passed. Once the coins or tokens have passed the second infrared phototransistor and light emitting diode or coin switch 30 for the count to be taken by the computer, the computer will send a signal to the servo motor 12 to push the plunger 14 and close the slot opening 24 in the coin acceptor gate 10. After the coins or tokens pass the third infrared phototransistor and light emmitting diode or coin switch 30 the computer will start the Pro-Aggressive jackpot into action. The adapter plate 28 at any time during the game's presence on the casino floor can be inserted without having to change the coin gate acceptor top plate 10 or coin gate slot 24. The operator simply inserts the adapter 28 that is needed for a particular denomination of coin 18 into the coin gate slot 24. The operator easily moves to the computer and presses a prescribed program indicating the size of coin whether it be a quarter or a fifty cent piece. The computer will readjust the servo motor 12 to move the plunger 14 to a pre-positioned position to accept only the size of coin programmed into the computer. The adapter is pre-cut to let the infrared phototransistors as the receivers and light emitting diodes as the dispatchers of light or coin switches 30 account for and let the coins or tokens pass as if the wagers were larger tokens or coins.

Those skilled in the art will appreciate the conception on which this disclosure is based and may readily be utilized as a basis for this disclosure. It is important therefore, that the claims be regarded as including such equivalent constructions insofar as they do not depart from the spirit and scope of the present invention and method.

I claim:

1. An adjustable coin gate acceptor comprising of an acceptor for receiving a metal coin, casino token made of metal or a casino playing chip.

2. An adjustable coin acceptor gate with a first infrared phototransistor as the receiver and an light emitting diode as the dispatcher of light or coin switch positioned directly below the top plate slot to activate a light and electronic noise or bell to alert the dealer that a wager is placed and ready for acceptance to set the wager in play.

3. An adjustable coin acceptor gate with a second infrared phototransistor as the receiver and a light emitting diode as the dispatcher of light or coin switch positioned directly below the plunger to count and add to the computer credits for the player to play a live casino game for redundant betting action.

4. The method of claim 3, utilizing a separate remote infrared phototransistor as the receiver and a light emitting diode as the dispatcher of light for counting the amount of coins or tokens passed through or by an infrared phototransistor as the receiver and a light emitting diode as the dispatcher of light or coin switch.

5. The method of claim 3, of visually displaying the amount of coin or tokens passed through or by an infrared phototransistor as the receiver and a light emitting diode as the dispatcher of light or coin switch.

6. An adjustable coin acceptor gate with a third infrared phototransistor as the receiver and a light emitting diode as the dispatcher of light or coin switch located in the drop path of the coin chute setting a Pro-Aggressive Jackpot in motion.

7. An adjustable coin acceptor gate with a servo motor positioned below the top coin slot plate at either the front or rear for use in opening or closing the slot.

8. An adjustable coin acceptor gate utilizing a plunger connected to a servo motor located below the top coin slot plate at either front or rear for use in opening or closing the slot.

9. An adjustable coin acceptor gate utilizing a computer with a pre-programmed solution to adjust the servo motor travel to accept a smaller dimension coin or token for use in live table gaming.

10. A gambling device with adjustable coin gate using an adapter to size the dimension of the coin or token wagered on a live table game.

11. An adjustable coin gate connected to remote player station utilizing the ability to accept a plurality of coins or tokens for the use in playing a live casino table game.

12. A gambling device indicating the condition of accepting a coin or token in a plurality of sizes to play a live casino table game used for gambling.

* * * * *